United States Patent
Mori et al.

(10) Patent No.: US 11,810,723 B2
(45) Date of Patent: Nov. 7, 2023

(54) CERAMIC ELECTRONIC COMPONENT

(71) Applicants: TDK CORPORATION, Tokyo (JP);
TDK XIAMEN CO., LTD., Fujian (CN)

(72) Inventors: Masahiro Mori, Xiamen (CN); Akihiro Masuda, Tokyo (JP); Shinya Ito, Tokyo (JP); Norihisa Ando, Tokyo (JP)

(73) Assignees: TDK CORPORATION, Tokyo (JP);
TDK XIAMEN CO., LTD., Xiamen (CN)

( * ) Notice: Subject to any disclaimer, the term of this patent is extended or adjusted under 35 U.S.C. 154(b) by 273 days.

(21) Appl. No.: 17/495,274

(22) Filed: Oct. 6, 2021

(65) Prior Publication Data
US 2022/0148808 A1 May 12, 2022

(30) Foreign Application Priority Data

Nov. 10, 2020 (CN) .......................... 202011244620.1

(51) Int. Cl.
| | |
|---|---|
| *H01G 4/232* | (2006.01) |
| *H01G 4/008* | (2006.01) |
| *H01G 4/012* | (2006.01) |
| *H01G 4/30* | (2006.01) |

(52) U.S. Cl.
CPC .......... *H01G 4/2325* (2013.01); *H01G 4/008* (2013.01); *H01G 4/012* (2013.01); *H01G 4/30* (2013.01)

(58) Field of Classification Search
CPC ........ H01G 4/008; H01G 4/012; H01G 4/228; H01G 4/2325; H01G 4/30
See application file for complete search history.

(56) References Cited

U.S. PATENT DOCUMENTS

| | | | | | |
|---|---|---|---|---|---|
| 4,788,625 | A | * | 11/1988 | Maijers .................. | H01G 4/232 361/309 |
| 2005/0140250 | A1 | * | 6/2005 | Takahashi ............ | H03H 9/0547 310/365 |
| 2021/0090805 | A1 | * | 3/2021 | Masuda .................. | H01G 2/103 |
| 2021/0125781 | A1 | * | 4/2021 | Masuda .................. | H01G 2/06 |
| 2021/0125782 | A1 | * | 4/2021 | Masuda ................. | H01G 4/232 |
| 2023/0178304 | A1 | * | 6/2023 | Song ....................... | H01G 4/30 361/301.4 |

FOREIGN PATENT DOCUMENTS

JP     S61-234519 A     10/1986

* cited by examiner

*Primary Examiner* — Nathan Milakovich
(74) *Attorney, Agent, or Firm* — Oliff PLC (57) ABSTRACT

A ceramic electronic component including: a ceramic element body including an end surface extending along a first axis, and a side surface extending along a second axis and intersecting the end surface; an end-face electrode formed on the end surface of the ceramic element body; and a lead terminal connected to the end-face electrode by soldering. The lead terminal includes: an adjacent part overlapping the end-face electrode in a side view from the second axis; and an extension part extending from an end of the adjacent part in a direction away from a plane including the side surface. A first recess is formed at the extension part and is recessed in a direction away from a plane including the end surface, and the first recess exists at a position close to the end of the adjacent part.

10 Claims, 8 Drawing Sheets

CERAMIC ELECTRONIC COMPONENT

BACKGROUND OF THE INVENTION

The invention relates to a ceramic electronic component with lead terminals.

A ceramic electronic component with lead terminals as shown in Patent Document 1 is known as an electronic component mounted on such as a circuit board. According to such ceramic electronic component, it is common to use a solder for connecting the lead terminals to a ceramic element body which terminal electrodes are formed. Specifically, as disclosed in Patent Document 1, soldering of lead terminals is performed by sandwiching a ceramic element body between a pair of lead terminals, and immersing or dipping thereof in a solder bath.

At this time, a fillet is formed between the lead terminal and the terminal electrode by the solder getting wet and spreading. At the end of the ceramic element body contacting the fillet, cracks are likely to occur inside the element body due to shrinkage stress generated during solidification of the solder. The presence of cracks inside the element body is a problem because the properties of electronic components such as moisture resistance and mechanical strength deteriorate.

Patent Document 1: Japanese Unexamined Patent Application S61-234519

BRIEF SUMMARY OF THE INVENTION

The present invention has been achieved in consideration of such situation. An object of the present invention is to provide a ceramic electronic component in which cracks generated in a ceramic element body are reduced.

To achieve the above object, a ceramic electronic component of the present invention includes:
- a ceramic element body including an end surface extending along a first axis, and a side surface extending along a second axis and intersecting the end surface;
- an end-face electrode formed on the end surface of the ceramic element body; and
- a lead terminal connected to the end-face electrode by soldering, wherein
  the lead terminal includes:
  - an adjacent part overlapping the end-face electrode in a side view from the second axis; and
  - an extension part extending from an end of the adjacent part in a direction away from a plane including the side surface,
  - a first recess is formed at the extension part and is recessed in a direction away from a plane including the end surface, and
  - the first recess exists at a position close to the end of the adjacent part.

A solder fillet is formed inside a crossing angle between a side surface of the ceramic element body and a lead terminal when the lead terminals are soldered by dipping. The solder fillet affects the generation of cracks in the ceramic element body. The first recess exists at a predetermined position of the extension part in the ceramic electronic component of the present invention. Thus, the molten solder staying in the area where the solder fillet is formed is attracted to the first recess side during soldering. As a result, the angle of the solder fillet with respect to the side surface of the ceramic element body becomes small, and it is possible to suppress the generation of cracks inside the ceramic element body.

Preferably, the first recess is open without being blocked in a direction of a third axis before soldering. The third axis is perpendicular to the first axis and the second axis. The molten solder staying in the area where the solder fillet is formed is easily attracted to the first recess side, and it is possible to further reduce the contact angle of the solder fillet. In addition, the stress generated in the connecting region due to solder can be reduced, when the first recess is open in the third axis direction without being blocked by a wall surface of the first recess. As a result, cracks generated inside the ceramic element body can be more preferably suppressed.

$Wx1$ is the maximum width of the adjacent part in the second axis and $Wx2$ is the maximum width of the extension part in the second axis at a deepest part of the first recess. In this case, $Wx2/Wx1$ is preferably 0.4 to 0.8. Inside of the first recess is filled with the molten solder attracted from the solder fillet side, and form a solder pool. When $Wx2/Wx1$ satisfies the above conditions, a sufficient volume of the solder pool can be secured, and molten solder is easily attracted from the solder fillet side. As a result, the angle of the solder fillet becomes smaller, and cracks generated inside the ceramic element body can be more preferably suppressed.

$L1/L0$ is preferably 0.3 or more, more preferably 0.3 to 0.7, further preferably 0.4 to 0.6, in which
  $L0$ is a height of the ceramic element body in the first axis, and
  $L1$ is a perpendicular distance from a lower end of the first recess in the first axis to the plane including the side surface.

By setting the lower end of the first recess according to the above conditions, the molten solder on the solder fillet side is likely to be attracted to the first recess side, and the angle of the solder fillet becomes smaller. As a result, cracks generated inside the ceramic element body can be more preferably suppressed.

A part of the first recess preferably extends from an upper end of the extension part to a part of the adjacent part in the first axis and
  the upper end of the first recess is preferably located above the plane including the side surface in the first axis.

The upper end of the first recess in the first axial direction may be located at the boundary between the adjacent part and the extension part, however, the molten solder on the solder fillet side is easily attracted to the first recess part side when the upper end of the first recess is above the side surface of the ceramic element body in the first axial direction. As a result, the angle of the solder fillet becomes smaller, and cracks generated inside the ceramic element body can be more preferably suppressed. In addition, the connecting strength of the lead terminal with respect to the end-face electrode is improved.

It is preferably $L1>L2$, and more preferably $L1/L2$ is 1.2 to 4.0, in which
  $L1$ is a perpendicular distance from a lower end of the first recess in the first axis to the plane including the side surface, and
  $L2$ is a perpendicular distance from the upper end of the first recess in the first axis to the plane including the side surface.

If the upper end of the first recess is located above the plane including the side surface of the ceramic element body along the first axis, the solder pool formed inside the first recess extends from the extension part to the adjacent part. In this case, if the relationship between $L1$ and $L2$ is $L1>L2$, the volume of the solder pool at the extension part becomes larger than the same at the adjacent part. As a result, the angle of the solder fillet becomes smaller, and cracks generated inside the ceramic element body can be more preferably suppressed.

L2 is preferably 0.2 times or less of L0, in which

L2 is a perpendicular distance from the upper end of the first recess in the first axis to the plane including the side surface.

The molten solder on the solder fillet side is likely to be attracted to the first recess side by setting the upper end position of the first recess as above, and that the angle of the solder fillet becomes smaller. As a result, cracks generated inside the ceramic element body can be more preferably suppressed.

The adjacent part includes a facing surface facing the end-face electrode. And a second recess, recessed in a direction away from the end-face electrode, may be formed at the facing surface. The presence of the recess on the facing surface also tends to improve the connecting strength of the lead terminals with respect to the end-face electrodes.

DESCRIPTION OF THE EMBODIMENTS

Hereinafter, the invention is described in detail based on the embodiments shown in the drawings, however, the present invention is not limited thereto.

Figure 1:
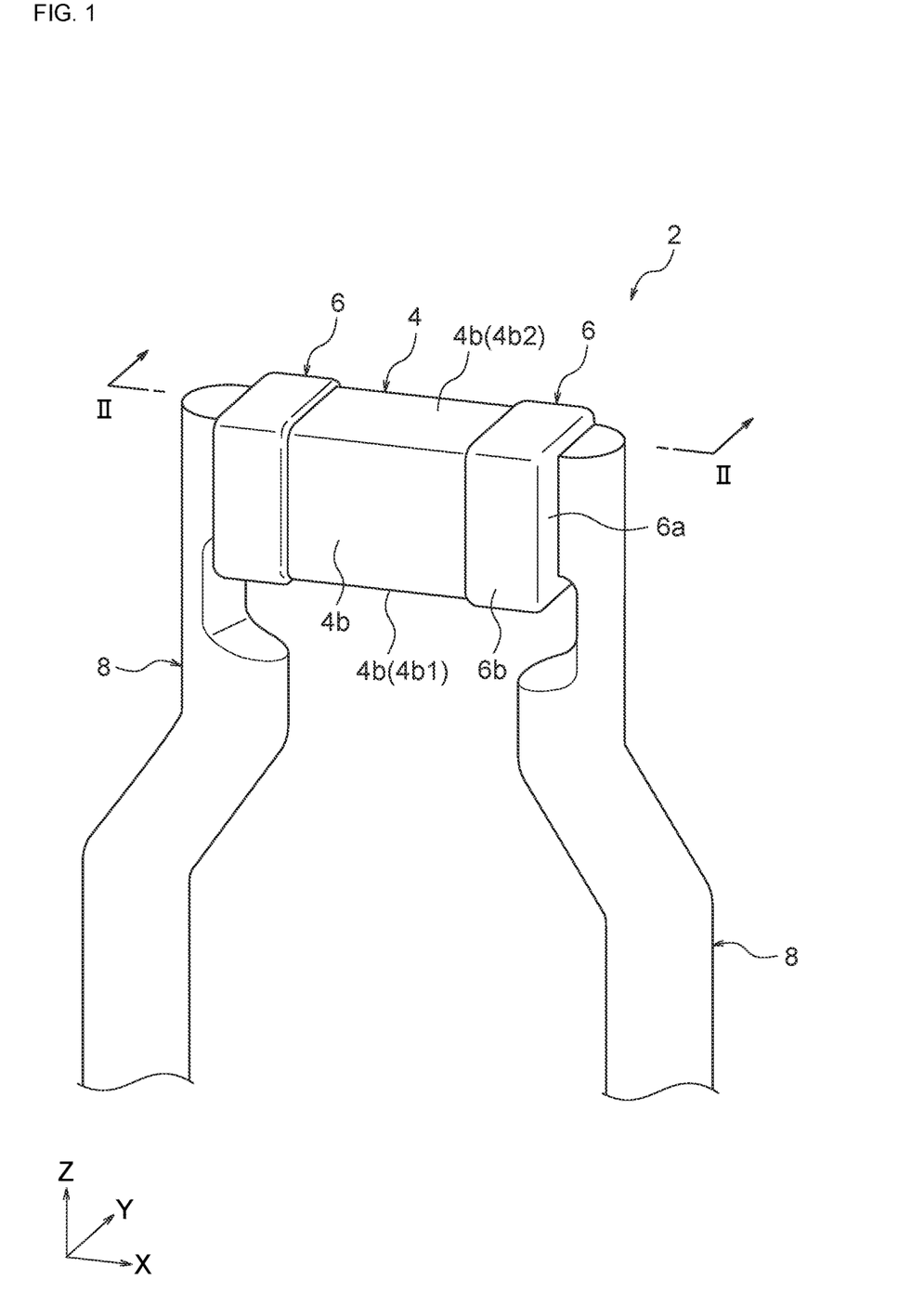
FIG. 1 is a simplified perspective view showing a ceramic electronic component according to an embodiment of the present invention.
Figure 2:
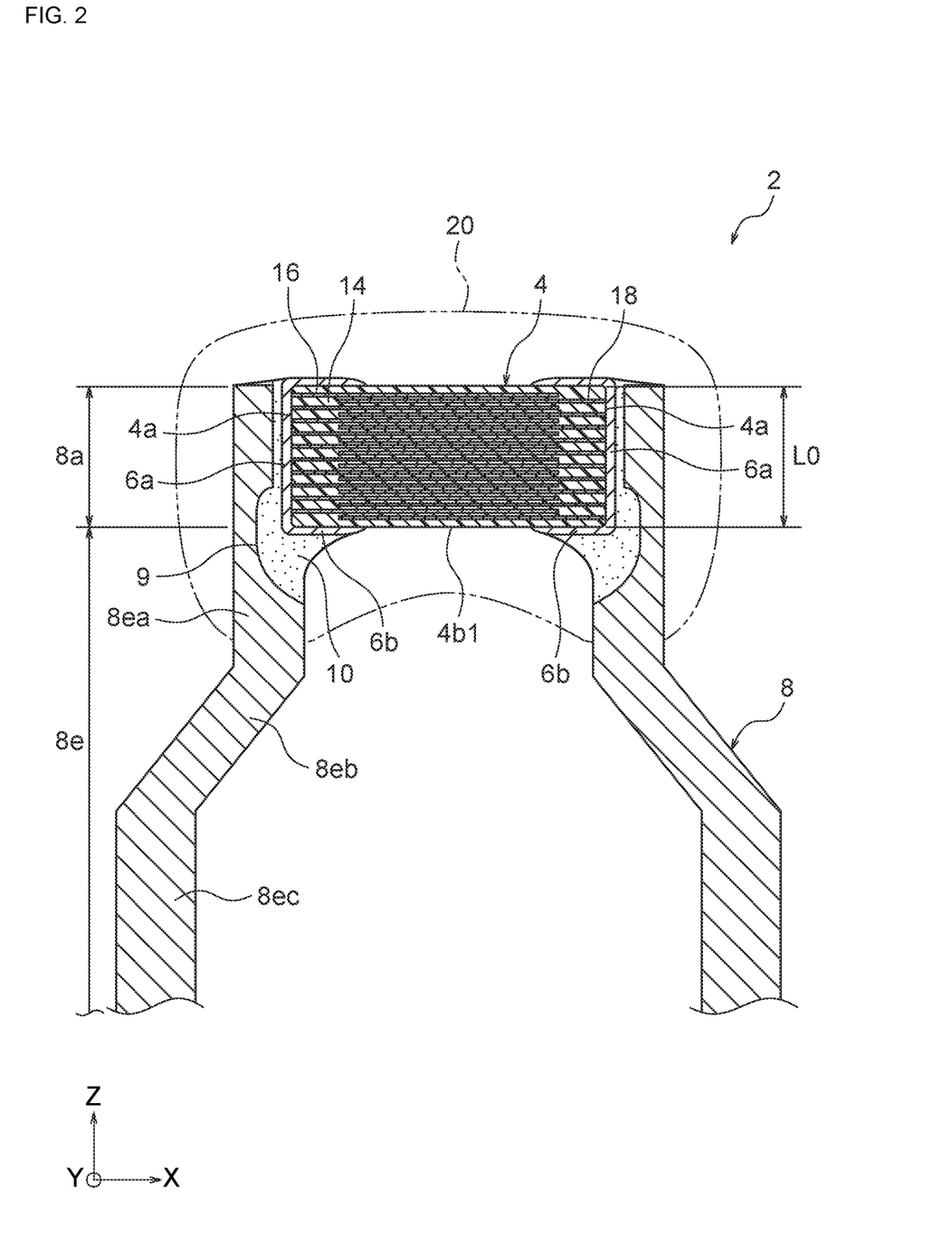
FIG. 2 is a cross-sectional view along the line II-II shown in FIG. 1.

As shown in FIGS. 1 and 2, the ceramic electronic component 2 with lead terminals according to an embodiment of the present invention has a ceramic element body 4 and a pair of lead terminals 8. According to the embodiment, the ceramic element body 4 is constituted by a multilayer ceramic capacitor as an example of the ceramic electronic component.

As shown in FIG. 2, the entire ceramic element body 4 and a part of the lead terminal 8 are covered with the exterior 20 indicated by the two-dot chain line. Coverage range of the exterior 20 is not particularly limited, however, the exterior 20 may cover at least the ceramic element body 4 and a connection part (i.e., where the below-described solder 10 exists) between the ceramic element body 4 and the lead terminals 8. The material of the exterior 20 is not particularly limited as long as it has an insulating property, but is preferably a halogen-free insulating resin and a thermosetting resin such as an epoxy resin is exemplified.

FIG. 1 and FIG. 2 show ceramic element body 4 having two end surfaces 4a facing in the X-axis direction and four side surfaces 4b linking the two end surfaces 4a. According to the embodiment, the side surface along the X-axis and located below in the Z-axis direction is referred to as a bottom surface 4b1. The side surface facing the bottom surface 4b1 is referred to as a top surface 4b2. Size of the ceramic element body 4 is not particularly limited, and may be appropriately determined according to the purpose and its application. For example, the length of the ceramic element body 4 may be 0.6 to 6.5 mm in the X-axis direction, the width may be 0.3 to 5.0 mm in the Y-axis direction, and the height (i.e., L0 shown in FIG. 2A) may be 0.2 to 3.5 mm in the Z-axis direction.

In the drawings, the X-axis, the Y-axis and the Z-axis are mutually substantially perpendicular, the end surface 4a is substantially parallel to the Z-axis, and the bottom surface 4b1 is substantially parallel to the X-axis. In the embodiment, "substantially parallel (or perpendicular)" means "most parts are parallel (or perpendicular), but some parts may not be parallel (or perpendicular)". For example, the end surface 4a or the bottom surface 4b1 may slightly have irregularities or inclinations. The concept of "up and low" in the embodiment is defined based on the mounting state on the substrate. That is, in the mounted state, the side where the ceramic element body is located is the "upper side (upper Z-axis)", and the terminal side of the lead terminal extending from the ceramic element body and connected to the substrate is the "lower side (lower Z-axis))".

Inside the ceramic element body 4, internal electrode layers 16 and 18 are alternately laminated via the ceramic layer 14. The internal electrode layer 16 is exposed on one end surface 4a of the ceramic element body 4 in the X-axis direction, and the internal electrode layer 18 is exposed on the other end surface 4a of the ceramic element body 4.

Further, a pair of terminal electrodes 6 are formed at both ends of the ceramic element body 4 in the X-axis direction. More specifically, the terminal electrode 6 is formed by wrapping around a part of the side surfaces 4b from the end surface 4a of the ceramic element body 4, and has an end-face electrode 6a covering the end surface 4a, and a side-face electrode 6b partly covers the side surfaces 4b which is continuous from the end-face electrode 6a. The internal electrodes 16 and 18 are electrically connected to the end-face electrodes 6a on the exposed end surfaces 4a, respectively. The pair of terminal electrodes 6 are mutually insulated, and the pair of terminal electrodes 6 and the internal electrode layers 16 and 18 form a capacitor circuit.

The ceramic layer 14 of the embodiment is composed of a dielectric composition. The dielectric composition to be used is not particularly limited, and a known material may be used. For example, barium titanate ($BaTiO_3$), calcium titanate ($CaTiO_3$), strontium titanate ($SrTiO_3$), calcium zirconate ($CaZrO_3$), potassium niobate ($KNbO_3$) and the like can be used as main components. In addition to these main components, rare earth element oxides, alkaline earth metal oxides, transition metal oxides, magnesium oxide and the like may be added as subcomponents. Thickness and the number of the ceramic layers 14 are not particularly limited, and maybe a general thickness and a general number of layers.

The internal electrode layers 16 and 18 contain a conductive metal as a main component. The conductive metal is not particularly limited, and a known material may be used. Nickel, copper, silver, gold, palladium, or alloys containing at least one of these metallic elements are exemplified as the conductive metal. The thickness of the internal electrode layers 16 and 18 is not particularly limited, and a general thickness can be adopted. The number of the internal electrode layers 16 and 18 is determined according to the number of the ceramic layers 14.

The terminal electrode 6 may also contain the conductive metal as a main component, and its material is not particularly limited. As the main component of the terminal electrode 6, copper, a copper alloy, nickel, a nickel alloy, or the like is generally used, however, silver, an alloy of silver and palladium or the like can also be used. The terminal electrode 6 may contain a glass frit or a resin in addition to the conductive metal. The thickness of the terminal electrode 6 is not particularly limited, and is usually around 10 to 50 μm. The surface of the terminal electrode 6 may be formed with at least one plated layer selected from nickel, copper, tin and the like. In this case, the thickness per one layer of the plated layer is preferably 1 to 10 μm, and the plated layer may have a multilayer structure. For example, the terminal electrode 6 can have a multi-layer structure of a Cu sintered electrode layer/Ni plated layer/Sn plated layer.

In the embodiment, as shown in FIG. 2, a pair of lead terminals 8 are provided corresponding to the two end surfaces 4a of the ceramic element body 4. Each lead terminal 8 extends along the Z-axis direction, and has an adjacent part 8a and an extension part 8e, respectively. Each part of the lead terminal 8 of the embodiment is integrally formed by processing a conductive wire. However, the lead terminal 8 may be formed by processing a conductive metal plate.

A metal wire containing copper (Cu), nickel (Ni), iron (Fe), silver (Ag), or the like can be used as the conductive wire constituting the lead terminal 8. In particular, the lead terminal 8 preferably contains copper. More specifically, it is preferable to use pure copper or a copper-based metal wire (hereinafter, referred to as Cu wire) which is a copper alloy containing copper as a main component. Alternatively, it is preferable to use a copper-coated steel wire (hereinafter, referred to as CP wire) having a copper-coated layer formed on its surface. In the case of CP wire, the core material is pure iron or an iron alloy containing iron as a main component. The thickness of the copper coating layer formed on the surface of the core material is preferably 5 μm to 10 μm when CP wire is used.

The wire diameter of the conductive wire constituting the lead terminal 8 is appropriately determined according to the size of the ceramic element body 4. For example, the wire diameter can be 0.5 mm to 1.0 mm, preferably 0.5 mm to 0.6 mm.

Next, the properties of each part of the lead terminal 8 will be described in detail. In the following description, one of the pair of lead terminals 8 will be illustrated, but the other lead terminal 8 also has the same properties.

As shown in FIG. 2, the tip end side (the upper Z-axis) of the lead terminal 8 is an adjacent part 8a adjacent to the ceramic element body 4. Specifically, the adjacent part 8a is a part that overlaps with the end-face electrode 6a in a side view from the direction in the X-axis, and the adjacent part 8a is connected to the end-face electrode 6a via the solder 10.

Figure 4:
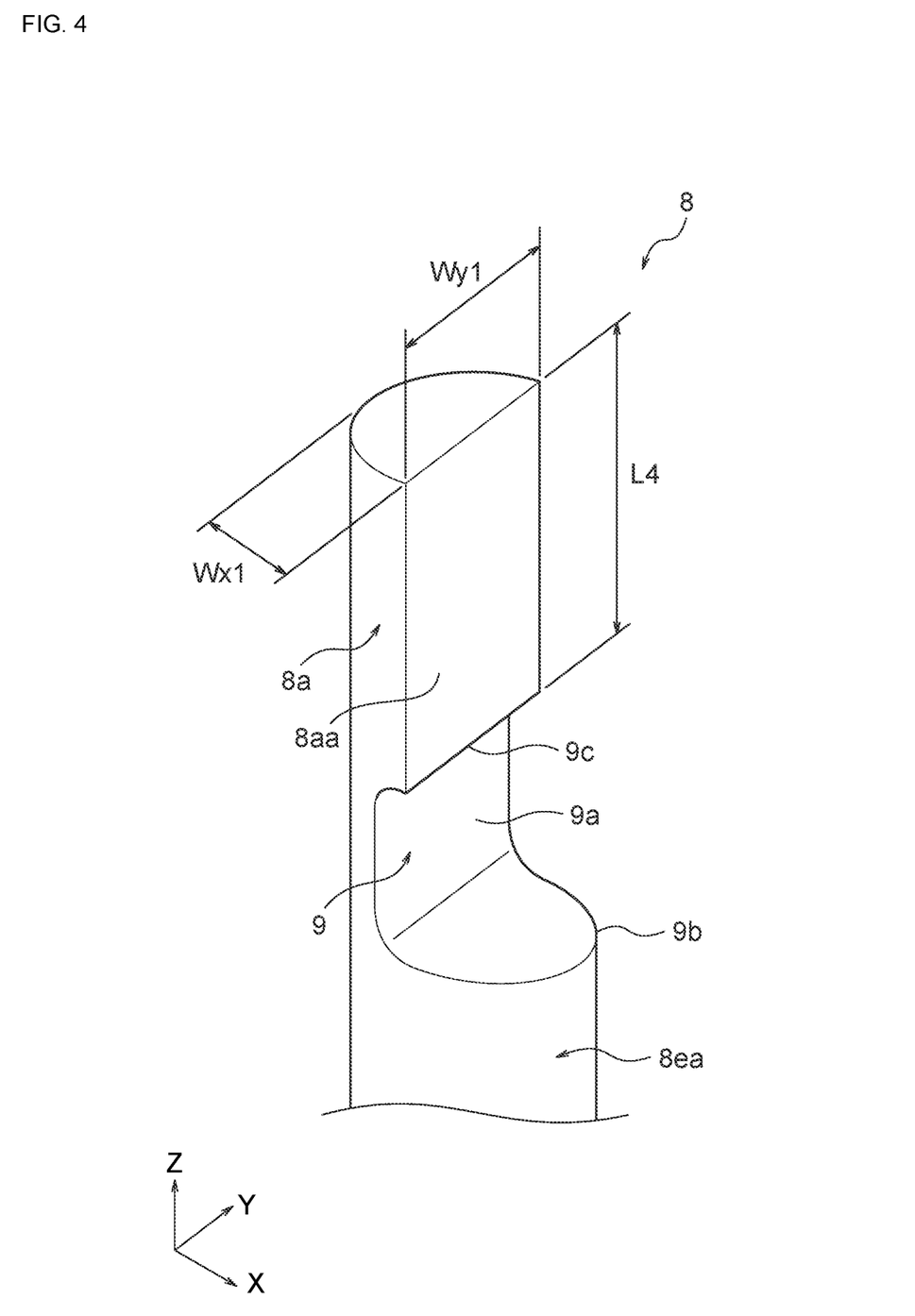
FIG. 4 is a schematic perspective view showing a tip shape of the lead terminal according to an embodiment of the present invention.

The adjacent part 8a is formed by pressing only the tip end side of the conductive wire, and has a shape similar to a semicircular columnar as a whole. More specifically, as shown in FIGS. 2 and 4, a part of the first recess 9 described later exists on the lower side of the adjacent part 8a, and the upper side of the adjacent part 8a is a semicircular columnar shape. A facing surface 8aa is formed at the semicircular columnar part of the adjacent part 8a by pressing. The facing surface 8aa is substantially parallel to the Y-axis and the Z-axis and faces the end-face electrode 6a.

According to this embodiment, the maximum width Wx1 of the adjacent part 8a in the X-axis direction is smaller than the maximum width Wx3 of the extension part 8e in the X-axis direction, where pressing process is not subjected. More specifically, the ratio of the maximum width Wx1 to the maximum width Wx3 (Wx1/Wx3) is preferably ½ to 7/10. The elastic force of the lead terminal 8 can be sufficiently secured by setting Wx1/Wx3 within the above range. The maximum width Wx3 of the extension part 8e in the X-axis direction is synonymous with a diameter of the conductive wire.

The width Wy1 of the facing surface 8aa in the Y-axis direction is preferably in the range of about 0.7 times to 1.1 times the width of the ceramic element body 4 in the Y-axis direction. Further, the length L4 of the facing surface Baa in the Z-axis direction may be about the same as the height L0 of the ceramic element body 4 in the Z-axis direction, or may be longer or shorter than L0; L4 may be in the range of 0.6 times to 0.9 times L0. By setting the size of the facing surface Baa existing in the adjacent part 8a to the above range, the ceramic element body 4 can be firmly sandwiched between the pair of lead terminals 8, and the joint strength between the terminal electrode 6 and the lead terminal 8 tends to improve.

Figure 3:
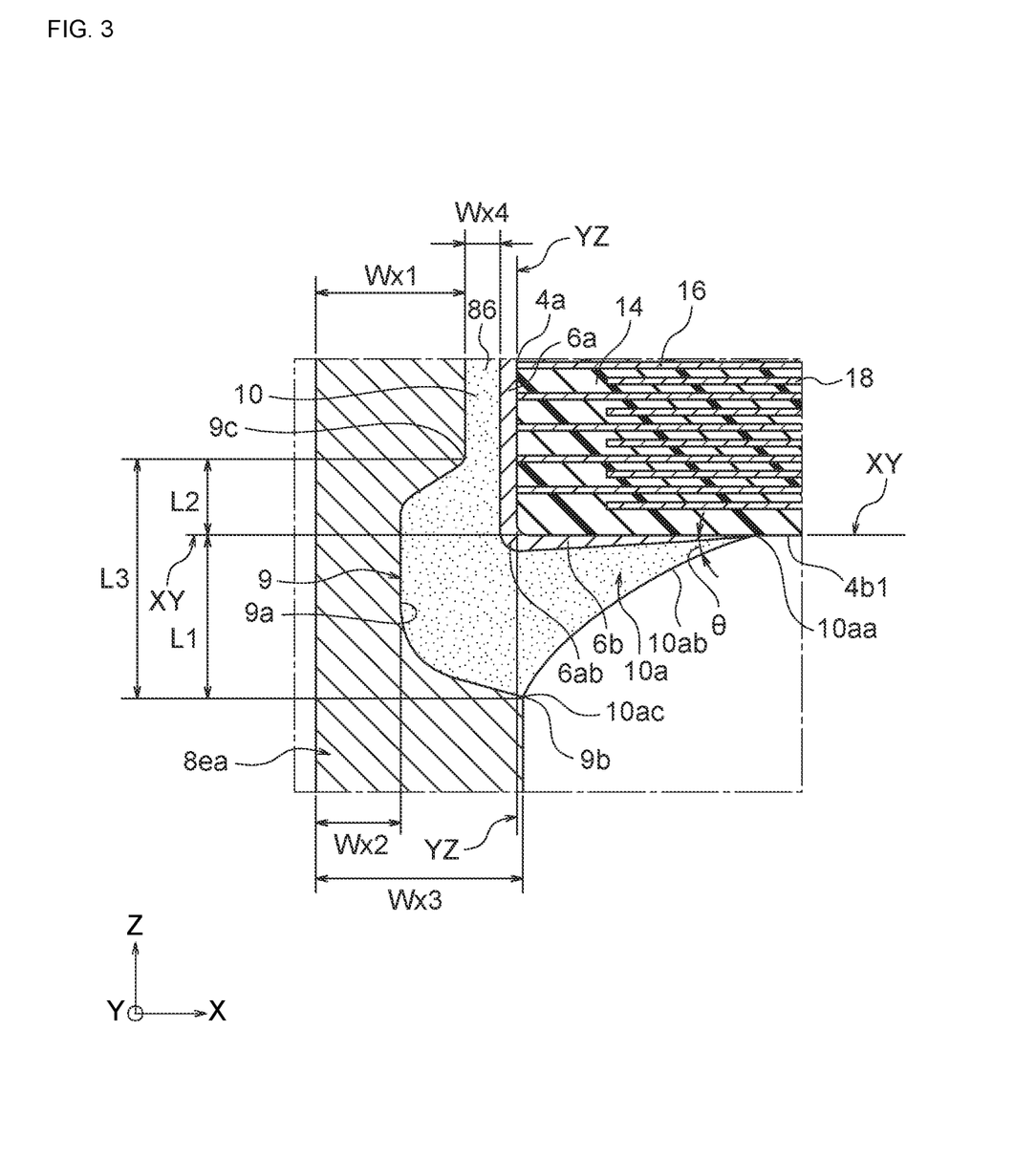
FIG. 3 is a cross-sectional view of a main part, which is an enlarged part of FIG. 2.

As shown in FIG. 3, a gap 86, in which the solder 10 is interposed, exists between the facing surface Baa and the end-face electrode 6b. Since the gap 86 is in proximity to the internal electrode layer 16 (18) of the ceramic element body 4, the amount of solder 10 intervening in the gap 86 is preferably controlled within an appropriate range. Specifically, the width Wx4 of the gap 86 in the X-axis direction is preferably 100 μm or less, and more preferably 30 μm or less. When the width of the gap 86 satisfies the above, the electric resistance of the solder connection can be reduced and the heat dissipation of the ceramic electronic component 2 improves.

The extension part 8e of the lead terminal 8 extends from the lower end of the adjacent part 8a in a direction away from a plane including the bottom surface 4b1. Here, "a plane including the bottom surface 4b1" refers to a virtual plane obtained by extending the bottom surface 4b1 along the X-axis and the Y-axis, and is indicated by reference XY in FIG. 3. And "a direction away from the plane including the bottom surface 4b1" includes a direction (i.e., Z-axis direction) perpendicular to the virtual plane and also includes the direction (not shown) that is inclined than the perpendicular direction and is toward the mounting substrate.

As shown in FIG. 2, the extension part 8e has an upper support part 8ea, a lower support part 8eb, and a leg part 8ec, and each parts of the extension part 8e is integrally continuous. The upper support part 8ea extends substantially parallel to the Z axis from the lower end of the adjacent part 8a toward the lower side in the Z axis direction. On the other hand, the lower support part 8eb exists continuously from the lower end of the upper support part 8ea. In addition, the lower support part 8eb is bent in a direction in which the pair of lead terminals 8 are mutually separated in the X-axis direction. The upper support part 8ea and the lower support part 8eb play a role of supporting the ceramic element body on the substrate in a state after the electronic component is mounted on the substrate. Further, the lower support part 8eb acts as a kink that regulates the standing height when the ceramic electronic component 2 is mounted on the substrate.

The leg part 8ec is integrally formed on the lower end side of the lower support part 8eb in the Z-axis direction, and extends linearly substantially parallel to the Z-axis. The leg part 8ec is connected to a mounting substrate such as a printed circuit board or a flexible substrate and form a mounting part. The method for mounting the ceramic electronic component 2 on the substrate is not particularly limited, and for example, mounting techniques such as soldering, welding, and caulking can be applied.

The extension part 8e is not pressed except for a part where the below described first recess 9 is formed, and the shape of the X-Y cross section of the extension part 8e is a circular shape. Further, the length of the extension part 8e in the Z-axis direction is not particularly limited. For example, the lengths of the upper support part 8ea and the lower support part 8eb may be appropriately determined in consideration of the standing height after mounting on the substrate.

In the ceramic electronic component 2 of this embodiment, the first recess 9 is formed at a part of the lead terminal 8 as shown in FIGS. 2 and 3. The first recess 9 is recessed in "a direction away from a plane including the end surface 4a". Inner side of the first recess 9 is filled with the solder 10 and becomes a solder pool. Here, "a plane including the end surface 4a" refers to a virtual plane obtained by extending the end surface 4a along the Y-axis and the Z-axis, and is indicated by reference YZ in FIG. 3. And "recess in a direction away from a plane including the end surface 4a" refers to "recess in the direction in which the width of the lead terminal 8 in the X-axis direction becomes smaller". The width of the lead terminal 8, where the first recess 9 is formed, is smaller than the width of the adjacent part 8a.

Further, the first recess 9 is formed at a position in consideration of the formation position of the solder fillet 10a. Specifically, the first recess 9 is formed at a position close to the lower end of the adjacent part 8a in the extension part 8e, and exists at the uppermost part of the extension part 8e in the Z-axis direction. When the first recess 9 is formed at the above position, the first recess 9 is located on the side of the solder fillet 10a in the X-axis direction, and the wall surface 9a of the first recess 9 faces the solder fillet 10a.

The solder fillet 10a is a part where excess solder 10 protrudes from between the lead terminal 8 and the end-face electrode 6a, and stays. When the lead terminal 8 is soldered to the ceramic element body 4 by dipping, the solder fillet 10a is formed in a space separated by a plane YZ including the end surface 4a and a bottom surface 4b1, which is outside (below the Z-axis) of the side-face electrode 6b (See FIG. 3).

In conventional ceramic electronic components manufactured by dipping, shrinkage stress is generated in the vicinity of the solder fillet, and cracks are likely to occur inside the ceramic element body. Further, a distortion is accumulated as the solder solidifies, in the solder fillet in which the solder is retained. Therefore, even after the solder solidification, cracks are likely to occur inside the ceramic element body, particularly near the solder fillet, when an external force is applied to the lead terminal. Cracks are more likely to occur when the volume of the solder fillet is large and the contact angle of the solder fillet with respect to the ceramic element body is large and becomes an obtuse angle.

According to the present embodiment, since the first recess 9 is formed at the predetermined position described above, the molten solder retained outside the side-face electrode 6b is attracted to the first recess 9 side when soldering the lead terminal 8. As a result, the solder does not easily stay below the Z-axis of the side-face electrode 6b, and the contact angle θ of the solder fillet 10a with respect to the ceramic element body 4 becomes as small as less than 40 degrees, preferably less than 35 degrees. As the contact angle θ becomes smaller, the stress exerted by the solder fillet 10a on the ceramic element body 4 becomes smaller, and it is possible to suppress the occurrence of cracks inside the ceramic element body 4. That is, it is considered that the occurrence of cracks inside the ceramic element body 4 can be suppressed by the effect of reducing the contact angle θ by the first recess 9 in the ceramic electronic component 2 of the embodiment.

The contact angle θ of the solder fillet 10a is the angle formed by the bottom surface 4b1 of the ceramic element body 4 and the outer edge 10ab of the solder fillet 10a at the tip 10aa of the solder fillet 10a in the X-axis direction. This contact angle θ can be measured by taking a cross-sectional photograph of the XZ cross section shown in FIG. 3 using an SEM or an optical microscope, then image analyzing the cross-sectional photograph. The sample for observation is obtained by cutting the ceramic electronic component 2 so that the XZ cross section is substantially at the center position of the lead terminal 8 in the Y-axis direction, and mirror-polishing thereof.

As described above, although it is possible to prevent the generation of cracks in the internal element body by the first recess 9 of this embodiment, it is further possible to enhance the effect of preventing the crack generation by optimizing the shape and size of the first recess 9. Hereinafter, the optimum mode of the first recess 9 is described.

First, as shown in FIGS. 1 and 4, it is preferable that the first recess 9 extends along the Y-axis direction, and is open along the Y-axis direction without being blocked by the wall surface 9a of the first recess 9 before soldering. In this case, the open part of the first recess 9 in the Y-axis direction is located below the plane XY including the bottom surface 4b1 in the Z-axis. Having the above properties of the first recess 9, during soldering, an excess molten solder tends flow outside of the lead terminals 8 and the molten solder is easily attracted to the first recess 9 side. As a result, the contact angle θ of the solder fillet 10a becomes small and acute, and is possible to enhance the effect of suppressing cracks. Further, since the first recess 9 is not blocked in the Y-axis direction by the wall surface 9a, it is considered that the distortion generated by the solidification of the solder 10 is less likely to be accumulated in the solder pool existing inside the first recess 9. This is because the distortion is dispersed from the open part in the Y-axis direction toward the outside of the lead terminal 8. As a result of reducing the distortion of the solder pool as described above, the crack suppressing effect of the first recess 9 is further improved.

Further, the ratio (Wx2/Wx1) of the maximum width Wx2 to the maximum width Wx1 of the adjacent part 8a is preferably 0.4 to 0.8 (see FIG. 3) when the maximum width of the extension part 8e in the X-axis direction at a deepest part of the first recess 9 is Wx2. By setting Wx2/Wx1 within the above range, the depth of the first recess 9 in the X-axis direction becomes sufficiently deep and the volume of solder retain can be sufficiently secured. Then, the molten solder staying in the area where the solder fillet 10a is formed is easily attracted to the first recess 9 side, and it is possible to further reduce the contact angle θ of the solder fillet 10a. As shown in FIGS. 2 and 3, the wall surface 9a of the first recess 9 is preferably curved in an arc shape. The wall 9a is gently curved, rather than having a right-angled corner. Thus, the solder 10 is easily filled inside of the first recess 9, and a contact angle θ of the solder fillet 10a can be made smaller.

Further, in this embodiment, it is preferable that the lower end 9b and the upper end 9c of the first recess 9 in the Z-axis direction are present at predetermined positions. Here, the lower end 9b of the first recess 9 is an edge of the pressing process trace, and the upper support part 8ea having a circular cross-sectional shape extends substantially parallel to the Z-axis below the lower end 9b in the Z-axis direction. On the other hand, the upper end 9c of the first recess 9 is a boundary edge between the first recess 9 and the facing surface 8aa, and extends substantially parallel to the Y-axis. Hereinafter, preferred modes of the lower end 9b and the upper end 9c are described in detail.

The position of the lower end 9b of the first recess 9 preferably satisfies the followings. The ratio (L1/L0) of the perpendicular distance L1 to the height L0 of the ceramic element body 4 is preferably 0.3 or more, more preferably 0.3 to 0.7, and the most preferably 0.4 to 0.6, in which L1 is the perpendicular distance from the lower end 9b of the first recess 9 in the Z-axis direction to the plane XY including the bottom surface 4b1. By setting L1/L0 within the above range, the opening surface of the first recess 9 in the X-axis direction can be sufficiently wide relative to the area where the solder fillet 10a is formed. Therefore, the molten solder staying in the area where the solder fillet 10a is formed is easily attracted to the first recess 9 side, and it is possible to further reduce the contact angle θ of the solder fillet 10a.

Further, it is preferable that the lower end 9b of the first recess 9 coincides with the lower end 10ac of the solder fillet 10a in the Z-axis direction. The molten solder is easily attracted to the first recess 9 side, and the contact angle θ can be made smaller by satisfying the above condition.

As described above, since the lower end 9b of the first recess 9 is the edge of the pressing process trace, the maximum width of the extension part 8e at the lower end 9b in the X-axis direction is about the same (that is, about the same as Wx3) as the diameter of the conductivity wire constituting the lead terminal. Therefore, the lower end 9b of the first recess 9 is located inside the X-axis direction than the plane YZ including the end surface 4a.

On the other hand, the upper end 9c of the first recess 9 may be located at the boundary between the adjacent part 8a and the extension part 8e in the Z-axis direction, or may be located below the bottom surface 4b1 in the Z-axis direction. However, as shown in FIG. 3, it is preferable that a part of the first recess 9 extends from the upper end of the extension part 8e to a part of the adjacent part 8a in the Z-axis direction. In this case, the upper end 9c of the first recess 9 is located above the plane XY including the bottom surface 4b1 in the Z-axis direction. When soldering the lead terminals 8 by dipping, the ceramic element body 4 is immersed in a solder bath with the adjacent part 8a of the lead terminals 8 facing downward in the gravity direction. The solder pool due to the first recess 9 is formed under the solder fillets 10a in the gravity direction during the dipping, since the upper end 9c of the first recess 9 is positioned above the bottom surface 4b1 in the Z-axis direction. Therefore, the molten solder, staying in the area where the solder fillet 10a is formed, is likely to be attracted to the first recess 9.

The intersection angle 6ab between the end-face electrode 6a and the side-face electrode 6b is covered with the solder pool by the first recess 9, since the upper end 9c of the first recess 9 is located above the bottom surface 4b1 in the Z-axis. That is, the solder pool formed inside the first recess 9 extends from the upper end of the extension part 8e to a part of the adjacent part 8a. Since the solder pool due to the first recess 9 is present on the lower end side of the adjacent part 8a, the connecting strength of the lead terminal 8 with respect to the ceramic element body 4 is improved.

Further, the relationship between L1 and L2 is preferably L1>L2, in which L2 is the perpendicular distance from the upper end 9c to the plane XY including the bottom surface 4b1. Further, the ratio of L1 to L2 (L1/L2) is preferably 1.2 to 4.0, and more preferably 1.5 to 2.0. The volume of the solder pool at the extension part 8e becomes larger than the same at the adjacent part 8a since the above conditions are satisfied. The molten solder is more likely to be attracted to the first recess part 9 side and the contact angle θ of the solder fillet 10a can be made smaller when the volume of the solder pool at the extension part 8e side becomes large as described above. Moreover, the crack suppressing effect can be further enhanced.

The ratio (L2/L0) of the perpendicular distance L2 with respect to the height L0 of the ceramic element body 4 is preferably 0 to 0.2. Further, the length L3 of the first recess 9 in the Z-axis direction is preferably 0.5 to 1.0 times with respect to L0.

The positions of the lower end 9b and the upper end 9c of the first recess 9 can be adjusted by the size of the press mold used in the pressing process. Alternatively, the positions of the lower end 9b and the upper end 9c can also be adjusted by controlling the fixed position of the ceramic element body 4 with respect to the lead terminal 8 when soldering.

It is possible to suppress the occurrence of cracks inside the ceramic element body 4 more effectively by satisfying the shape and size of the first recess 9 above mentioned.

As a method of suppressing cracks caused by the solder fillets, it has been conventionally known to form a non-affinity layer having poor wettability on a part of lead terminals. This non-affinitive layer can be formed, for example, by oxidizing a part of the surface of the lead terminal. The non-affinity layer can also be formed by removing the plated layer (a coating layer having good wettability) on the surface of the lead terminal by mechanical polishing or laser processing. That is, in the prior art, the formation of a solder fillet is suppressed by forming a place where the solder does not get wet on a part of the lead terminal. A crack suppressing effect can be expected even with this conventional technique. However, it is not always easy to locally form the non-affinity layer on the lead terminal, and particularly it becomes difficult to form the non-affinity layer when the size of the ceramic element body 4 becomes small. In addition, the connecting strength of the lead terminal with respect to the ceramic element is lowered when the solder connecting region is narrowed by the non-affinity layer.

In contrast, in this embodiment, the first recess 9 can be easily formed by the pressing process using the press mold. Therefore, cracks can be reliably suppressed, and the manufacturing cost can also be suppressed, even when the size of the ceramic element body 4 is reduced. Moreover, inside of the first recess 9 is a solder pool, in the ceramic electronic component 2 of this embodiment. Thus, cracks in the ceramic electronic component 2 are suppressed, and the lead terminal 8 can be connected more firmly than the above-mentioned conventional techniques.

Note that, a material of the solder 10 used for connecting the lead terminals 8 is not particularly limited. For examples, lead-free solders such as tin-antimony based solder, tin-silver-copper based solder, tin-copper based solder, and tin-bismuth based solder can be used as the solder 10.

Further, although not shown in FIGS. 2 and 3, a coating layer such as a metal plated layer may be formed on the surface of the lead terminal 8. The type of the coating layer is not particularly limited, and different types of coating layers may be formed on the front end side (the adjacent part side) and the rear end side (the leg part side) of the lead terminal 8. Particularly, it is preferable that a coating layer, having a better solder wettability than the core material of the lead terminal 8, is formed on a surface of the lead terminal 8 that contacts with the solder 10 (the adjacent part 8*a* and a part of the upper support part 8*ea* including the first recess 9). The "coating layer having better solder wettability" includes, for example, an alloy layer containing copper and tin, and more specifically, an alloy layer containing $Cu_6Sn_5$ is preferable. It is possible to further reduce the contact angle θ of the solder fillet 10*a* by forming the coating layer on the contact surface with the solder 10.

The thickness of the coating layer may be about 0.5 μm to 10 μm, preferably 1.0 μm to 7.0 μm, and more preferably 1.0 μm to 3.0 μm when forming the coating layer as described above. The thickness of the coating layer can be measured by observing a cross section with a scanning electron microscope (SEM) or the like, and the components constituting the coating layer can be confirmed by a technique such as an electron probe microanalyzer (EPMA) or electron diffraction.

Subsequently, an example of a method for manufacturing the ceramic electronic component 2 is described below.

First, a capacitor chip is prepared as the ceramic element body 4. The capacitor chip may be manufactured by a known method. For instance, a green sheet on which an electrode pattern is formed is laminated by a method such as a doctor blade method or screen printing to obtain a multilayer body. Then, the obtained multilayer body is pressurized and fired to obtain the capacitor chip.

Next, a pair of terminal electrodes 6 are formed on the prepared capacitor chip. The method for forming the terminal electrode 6 is not particularly limited. For example, the terminal electrodes 6 (sintered electrode layers) can be formed by immersing the capacitor chip in a conductive paste and then performing a baking process. Alternatively, the terminal electrodes 6 (resin electrode layers) may be formed by applying a conductive paste containing a thermosetting resin to the capacitor chip and then curing the resin by a heat treatment. Further, the surface of the sintered electrode layers or the resin electrode layers may be plated as appropriate.

Next, a method of manufacturing the lead terminals 8 is described. First, a conductive wire is prepared in the manufacture of the lead terminal 8. The conductive wire is preferably a Cu wire having a tin-plated layer formed on its surface or a CP wire having a tin-plated layer further formed on the surface of the Cu-plated layer. The tin-plated layer formed on the surface of the Cu wire or the CP wire preferably contains 90 mol % or more of tin, and preferably has a thickness of 1 μm to 10 μm.

Instead of the tin-plated layer, a silver-plated layer, a gold-plated layer, a palladium-plated layer, a copper-tin-plated layer, or the like may be formed on the surface of the conductive wire. Moreover, a nickel-plated layer may be formed as a base layer in case of forming the gold-plated layer or the palladium-plated layer.

The prepared conductive wire is cut to a predetermined length, and then bent thereof to have a U-shape. Next, the U-shaped conductive wire is attached to the carrier tape and fixed. At this time, the conductive wire is fixed so that both ends of the U-shape protrude from the carrier tape.

Thus, the conductive wires in a state of sticking to the carrier tape, the tip end of the conductive wire is processed into the shape shown in FIG. 4. Specifically, first, both ends of the conductive wire are bent to form the upper support part 8*ea* and the lower support part 8*eb*. Thereafter, the tip of the conductive wire is pressed, and the shape of the adjacent part 8*a* having the facing surfaces Baa and the first recess 9 are formed. The order of bending and pressing may be reversed. For the mass production, multiple conductive wires may be attached on the carrier tape and the above-mentioned tip processing may be performed at the same time.

Next, the ceramic element body 4 and the lead terminals 8 manufactured by the above procedure are connected to obtain a ceramic electronic component 2. For example, when forming an alloy layer having good wettability on the surface of the lead terminals 8 (especially at the part in contact with the solder 10), the lead terminals 8 are joined to the ceramic element body 4 by the procedure mentioned below.

First, only the tip of the lead terminal 8 attached to the carrier tape is immersed in a solder bath to form an alloy layer containing copper and tin on the surface of the lead terminal 8. This is an immersing process of the lead terminal 8.

In the above immersing process, the type of solder bath may be the same as the solder bath used in the soldering process of the lead terminal 8 to the ceramic element body 4, but may be different. The temperature of the solder bath varies depending on the composition of the solder, for example, it may be 270° C. to 320° C. in the case of tin-antimony based solder. In particular, the temperature of the solder bath in the immersing process is preferably about 0.9 to 1.1 times the temperature of the solder bath in the soldering process.

Further, the immersing time in the solder bath during the immersing process is preferably about 10 to 60 times longer than the immersing time during the soldering process, and more specifically, it is preferably about 10 to 60 seconds.

According to the above immersing process, a part of the tin-plated layer, formed on the surface of the conductive wire, is dissolved in the solder bath and an alloy layer containing copper and tin are formed. The tin-plated layer remains on the surface of legs part 8*ec*, the lower support part 8*eb*, and a part of the upper support part 8*ea* that are not immersed in the solder bath.

After performing the above immersing process, the ceramic element body 4 having the terminal electrode 6 is arranged between the adjacent parts 8*a* of the pair of lead terminals 8, and the ceramic element body 4 is temporarily fixed by sandwiching with the pair of facing surfaces 8*aa*. During the temporary fixing, the upper end (the tip of the lead terminal 8) of the adjacent part 8*a* and the upper end (top surface 4*b*2) of the ceramic element body 4 may be displaced in the Z-axis direction, but the upper end of the adjacent part 8*a* and the upper end of the ceramic element body 4 are preferably aligned. The lead terminals 8 are arranged at an appropriate position with respect to the ceramic element body 4 by temporarily fixing with such method, and the dimensional error during manufacturing can be reduced.

Next, the ceramic element body 4 sandwiched between the lead terminals 8 is immersed in a solder bath, and the terminal electrodes 6 and the lead terminals 8 are soldered. This is a soldering process. At this time, the tip end side (the upper end side in the Z-axis of the adjacent part 8*a*) of the lead terminals 8 is directed downward in the gravity direction, and the ceramic element body 4 is immersed in the solder bath. During this soldering process, the immersing time in the solder bath is about 0.5 to 2 seconds and is particularly preferably as short as about 0.8 to 1.5 seconds. By setting the immersing time in the soldering process within the above range, the heat effect on the ceramic element body 4 can be minimized.

After the soldering process, a part immersed in the solder bath is immersed in a liquid insulating resin bath. At this time, at least the solder connecting part of the ceramic element body 4 and the lead terminals 8 is immersed in the insulating resin bath. Then, exterior 20 is formed to cover a part of the ceramic element body 4 and the lead terminals 8 by appropriately applying a heat treatment and a cool drying depending on the type of the used insulating resin.

The series of the joining process described above may be performed in a state where the lead terminals 8 are attached to the carrier tape and fixed. After forming the exterior 20, a linking part (that is, the U-shaped arc part) of the pair of the leg parts 8ec is cut and the lead terminals 8 are removed from the carrier tape to obtain the ceramic electronic component 2 shown in FIGS. 1 and 2.

Hereinbefore, an embodiment of the present invention is explained, but the present invention is not limited to the above-mentioned embodiment and can variously be modified within the scope of the present invention.

Modification Example

Figure 5:
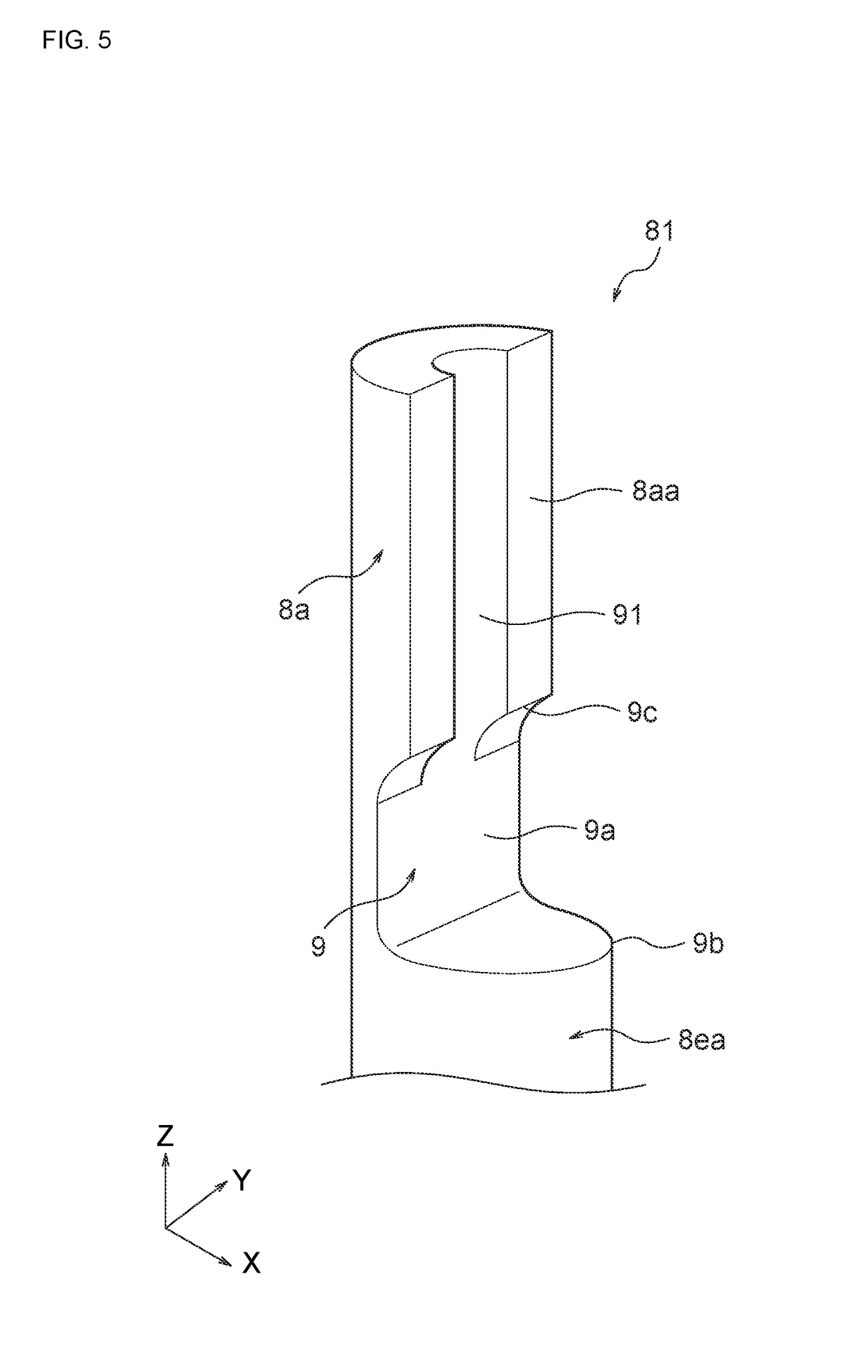
FIG. 5 is a schematic perspective view showing a modified example of a tip shape of the lead terminal.

For example, the lead terminals 8 may have a form as shown in FIG. 5. A second recess 91 is formed on the facing surface Baa of the adjacent part 8a in the lead terminal 81 shown in FIG. 5. The second recess 91 extends along the Z-axis from the upper end to the lower end of the facing surface 8aa. Further, the lower end of the second recess 91 in the Z-axis direction is connected to the first recess 9, and the second recess 91 and the first recess 9 mutually communicate. A crack suppressing effect can be expected even when the lead terminal 81 shown in FIG. 5 is used. In addition, since the lead terminal 81 is used, the amount of solder 10 interposed in the gap 86 between the facing surface Baa and the end-face electrode 6a increases, and the connecting strength of the lead terminal 81 tends to improve.

Further, according to the lead terminal 8 shown in FIGS. 2 and 3, the upper support part 8ea extends substantially parallel to the Z-axis, but the extension direction of the upper support part 8ea is not limited thereto. For example, the upper support part 8ea may be bent outward in the X-axis direction from the lower end 9b of the first recess 9. "The outward in the X-axis direction" is a direction in which the pair of lead terminals are separated from each other. As the upper support part 8ea is bent in this way, the contact angle θ of the solder fillet 10a tends to be smaller.

EXAMPLE

Sample 1

In sample 1, 30 capacitor samples were manufactured by using the lead terminals 8 having a tip shape as shown in FIG. 4, and evaluated the crack generation rate thereof.

First, as the ceramic element body 4, a capacitor chip having a length of 1.6 mm in the X-axis direction, a width of 0.8 mm in the Y-axis direction, and a height L0 of 0.8 mm in the Z-axis direction was prepared. Then, a pair of the terminal electrodes 6 having a Cu sintered electrode layer, a Ni plating layer, and a Sn plating layer was formed on the capacitor chip.

Further, as a raw material for the lead terminals 8, a Cu wire having a diameter of 0.5 mm and having a tin-plated layer formed on the surface was prepared. Then, this Cu wire was processed into the shape shown in FIG. 4, and soldered to the capacitor chip according to the procedure described in the embodiment. The detailed size of the lead terminals 8 are shown below. The following sizes are average values thereof. Cross sections of 30 completed capacitor samples were observed by SEM, and then the obtained cross-sectional photographs were measured by image analyzing thereof.

$Wx1/Wx3 = 0.75$ $Wx2/Wx1 = 0.72$ $L1/L0 = 0.50$ $L2/L0 = 0.20$ (Evaluation of Crack Occurrence Rate)

It was investigated whether cracks were generated in the capacitor samples prepared by the above procedure. The presence or absence of cracks was confirmed by observing the cross section of the capacitor samples with an optical microscope, and the sample in which even a small number of cracks were present inside the element body (capacitor chip) was regarded as NG. The survey was conducted on 30 samples, and the percentage of samples having crack was calculated as the crack occurrence rate.

Comparative Example 1

Figure 6:
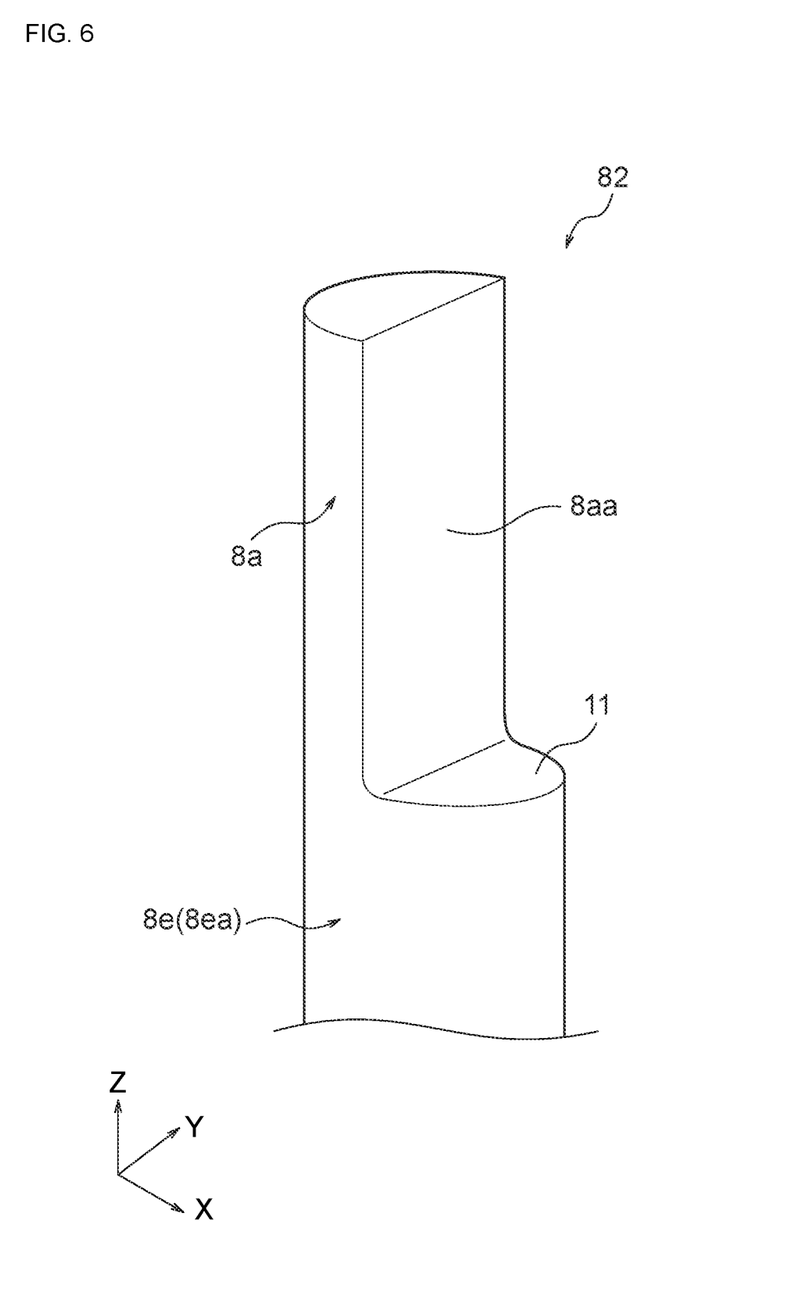
FIG. 6 is a schematic perspective view showing a tip shape of the conventional lead terminal.
Figure 7:
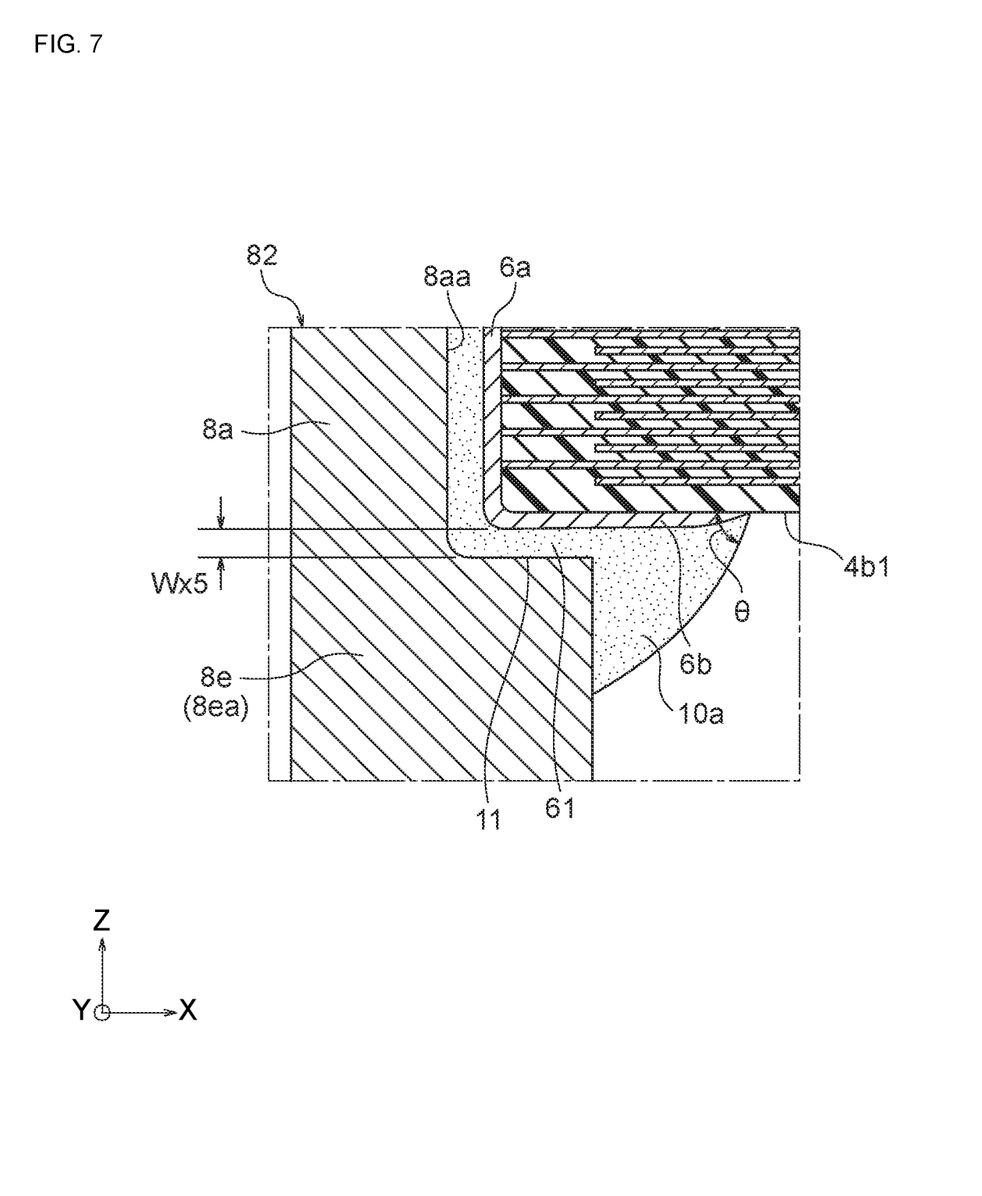
FIG. 7 is an enlarged cross sectional view of a main part according to the ceramic electronic component using the lead terminal shown in FIG. 6.

In Comparative Example 1, the conventional lead terminals 82 shown in FIGS. 6 and 7 were used. Here, the features of the lead terminals 82 shown in FIGS. 6 and 7 are described. The adjacent part 8a was subjected to pressing process and the facing surface Baa was formed at the lead terminal 82, however, the first recess 9 was not formed at the lead terminal 82. In the lead terminal 82, a stepped surface 11 substantially parallel to the X-axis and the Y-axis was formed at the boundary position between the adjacent part 8a and the extension part 8e (upper support part 8ea) by pressing. The stepped surface 11 contacted with the side-face electrode 6b during soldering and played a role of adjusting the positional relationship between the lead terminal 82 and the capacitor chip.

The lead terminals 82 each having the above properties were soldered to the capacitor chip similarly as in Sample 1 to obtain capacitor samples of Comparative Example 1. Then, the crack occurrence rate of Comparative Example 1 was calculated by the same method as that of Sample 1.

Sample 2

Reference Example

Figure 8:
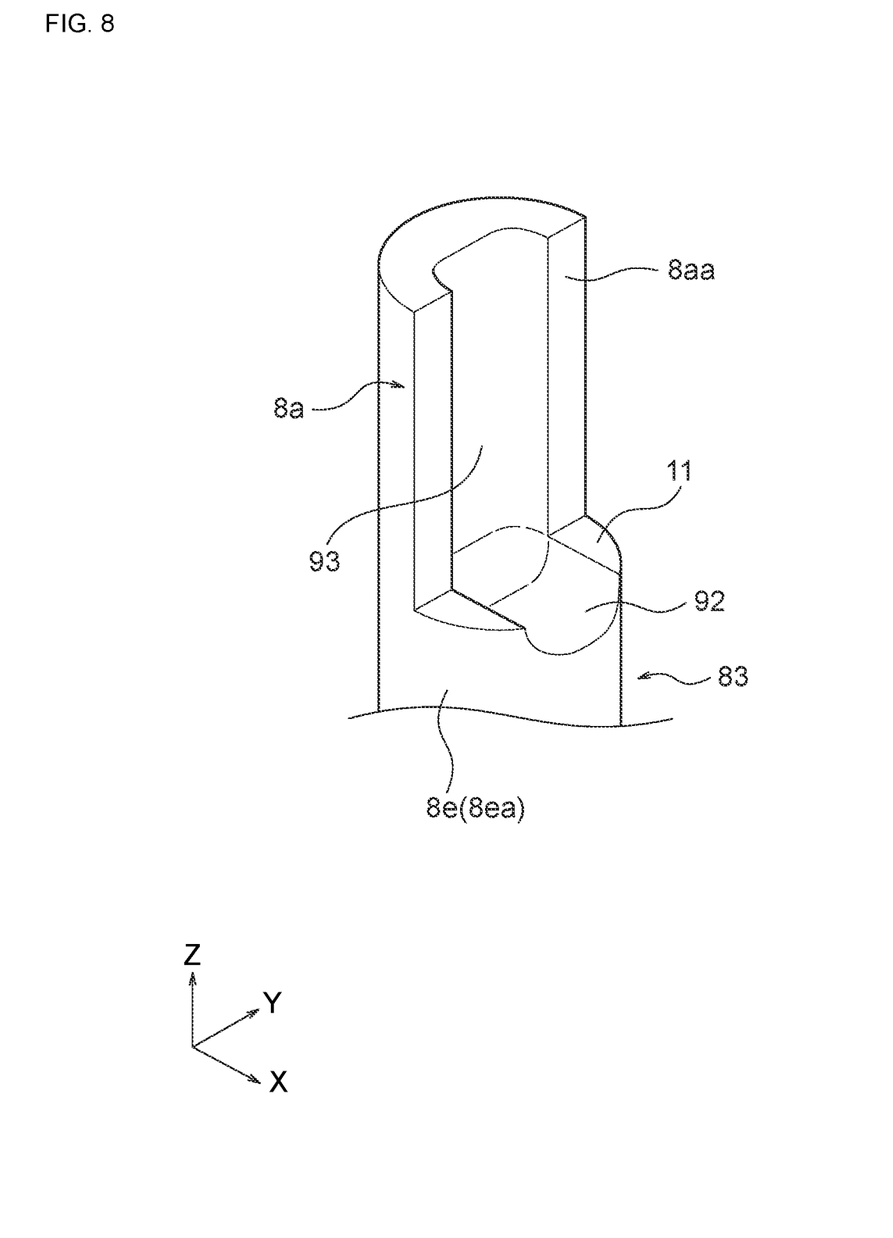
FIG. 8 is a schematic perspective view showing a tip shape of the lead terminal used in reference example.

In sample 2, the lead terminal 83 shown in FIG. 8 was used. The features of the lead terminal 83 shown in FIG. 8 are described hereinafter. In the lead terminal 83, similarly to the conventional lead terminal 82 shown in FIG. 7, the adjacent part 8a is pressed and a stepped surface 11 is formed at the boundary between the adjacent part 8a and the extension part 8e. In the lead terminal 83, a third recess 92 is formed on the stepped surface 11, and a fourth recess 93 is formed on the facing surface 8aa. The third recess 92 extends along the X-axis direction, and the fourth recess 93 extends along the Z-axis direction. The third recess 92 and the fourth recess 93 mutually communicate at the intersection angle between the facing surface 8aa and the stepped surface 11.

The lead terminals 83 each having the above properties were soldered to the capacitor chip similarly as in sample 1 to obtain capacitor samples of sample 2. The perpendicular distance L1 from the lower end of the third recess 92 to the surface including the bottom surface 4b1 was measured after soldering. The perpendicular distance L1 was approximately 0.2 times the height L0 (0.2×L0) of the capacitor chip. The presence of cracks was evaluated for the sample 2 by the same method as for sample 1.

Evaluation Results

The crack occurrence rate of Comparative Example 1 was 63%, and cracks were generated in more than half of the samples in Comparative Example 1. FIG. 7 is an enlarged cross-sectional view of a main part showing the capacitor sample of Comparative Example 1. As shown in FIG. 7, the conventional lead terminal 82 does not have a recess formed at a part corresponding to the solder fillet 10a. Therefore, in the capacitor samples of Comparative Example 1, a large amount of solder remained between the bottom surface 4b1 of the element body and the extension part of the lead terminal 82, and the contact angle θ of the solder fillet 10a exceeded 50 degrees and showed an obtuse angle. In Comparative Example 1, it is considered that many cracks were generated due to the influence of the obtuse-angled solder fillet 10a.

As shown in FIG. 7, there is a gap 61 filled with solder between the stepped surface 11 and the side-face electrode 6b. However, the width Wx5 of the gap 61 is approximately 20 μm at the maximum, and the gap 61 does not have a function of attracting the solder staying in the solder fillet 10a to reduce the contact angle θ. Therefore, the gap 61 cannot be regarded as a recess.

On the other hand, the crack occurrence rate was 40% in the sample 2 (reference example) using the lead terminal 83 shown in FIG. 8, and the cracks could be reduced as compared with the comparative example 1. Further, in Sample 2, the contact angle θ of the solder fillet 10a was acuter than that of Comparative Example 1. It is conceivable that the contact angle θ became an acute angle in the lead terminal 83, due to the molten soler attracted to the third recess 92 when the third recess 92 formed on the stepped surface 11 is located on the side of the solder fillet 10a.

The crack occurrence rate could be reduced the most in the sample 1 using the lead terminal 8 shown in FIG. 4. Specifically, the contact angle θ of the solder fillet 10a in sample 1 was sharper than that of Comparative Example 1, and even sharper than that of sample 2. In sample 1, the crack occurrence rate was 13%, and the occurrence of cracks could be suppressed as compared with sample 2. The following reasons can be considered as the reason why the crack generation rate of sample 1 is suppressed than that of sample 2.

First, it is considered that the difference in sizes of the recesses is related. The third recess 92 of the sample 2 shows L1/L0 of around 0.2, whereas the first recess 9 of the sample 1 shows L1/L0 of 0.5. Therefore, it is considered that the first recess 9 of the sample 1 has a stronger effect of drawing in the molten solder than the third recess 92 of the sample 2.

Further, it is considered that the opening direction of the recess is related. The third recess 92 of the sample 2 extends along the X-axis direction, and is closed by the recessed wall surface in the Y-axis direction. That is, the inside of the third recess 92 becomes a solder pool, however, the solder pool due to the third recess 92 is surrounded by the wall surface of the third recess 92 and the same of the fourth recess 93. On the other hand, since the first recess 9 of the sample 1 is open along the Y-axis direction, the solder pool due to the first recess 9 is not restricted by the wall surface of the first recess 9 in the Y-axis direction. Therefore, in the sample 1, it is considered that the distortion generated during solidification of the solder is easily dispersed to the outside of the lead terminal 8 and is less likely to be accumulated in the solder pool of the first recess 9. As a result, it is considered that the sample 1 was able to suppress cracks more effectively than the sample 2.

In the above examples, Cu wire was used as the conductive wire for the lead terminal. The CP wire was also used as the conductive wire, and the same experiment as above was also performed. The same result as in the above examples was obtained even when the CP wire was used, and the crack occurrence rate could be reduced the most when using the lead terminal shape shown in FIG. 4.

EXPLANATION OF REFERENCES 2 ceramic electronic component
4 ceramic element body
  4a end surface
  4b side surface
    4b1 bottom surface
    4b2 top surface
6 terminal electrode
  6a end-face electrode
  6b side-face electrode
  6ab intersection angle
8, 81 to 83 lead terminal
  8a adjacent part
    8aa facing surface
      91 second recess
  8e extension part
    8ea upper support part
    8eb lower support part (kink)
    8ec leg part (substrate mounting part)
9 first recess
  9a wall surface
  9b lower end
  9c upper end
10 solder
  10a solder fillet
    10aa tip
    10ab outer edge
    10ac lower end
11 stepped surface
20 exterior

What is claimed is:

1. A ceramic electronic component comprising:
a ceramic element body including an end surface extending along a first axis, and a side surface extending along a second axis and intersecting the end surface;
an end-face electrode formed on the end surface of the ceramic element body; and
a lead terminal connected to the end-face electrode by soldering, wherein
the lead terminal comprises:
an adjacent part overlapping the end-face electrode in a side view from the second axis; and
an extension part extending from an end of the adjacent part in a direction away from a plane including the side surface, a first recess is formed at the extension part and is recessed in a direction away from a plane including the end surface, and the first recess exists at a position close to the end of the adjacent part.

2. The ceramic electronic component according to claim 1, wherein the first recess is open without being blocked in a direction of a third axis before soldering in which the third axis is perpendicular to the first axis and the second axis.

3. The ceramic electronic component according to claim 1, wherein

Wx2/Wx1 is 0.4 to 0.8 in which

Wx1 is the maximum width of the adjacent part in the second axis and

Wx2 is the maximum width of the extension part in the second axis at a deepest part of the first recess.

4. The ceramic electronic component according to claim 1, wherein L1/L0 is 0.3 or more in which L0 is a height of the ceramic element body in the first axis, and L1 is a perpendicular distance from a lower end of the first recess in the first axis to the plane including the side surface.

5. The ceramic electronic component according to claim 4, wherein a part of the first recess extends from an upper end of the extension part to a part of the adjacent part in the first axis and the upper end of the first recess is located above the plane including the side surface along the first axis.

6. The ceramic electronic component according to claim 5, wherein

L1>L2, in which

L2 is a perpendicular distance from the upper end of the first recess in the first axis to the plane including the side surface.

7. The ceramic electronic component according to claim 6, wherein L1/L2 is 1.2 to 4.0.

8. The ceramic electronic component according to claim 5, wherein

L2 is 0.2 times or less of L0, in which

L2 is a perpendicular distance from the upper end of the first recess in the first axis to the plane including the side surface.

9. The ceramic electronic component according to claim 1, wherein a part of the first recess extends from an upper end of the extension part to a part of the adjacent part in the first axis and the upper end of the first recess is located above the plane including the side surface in the first axis.

10. The ceramic electronic component according to claim 1, wherein the adjacent part includes a facing surface facing the end-face electrode, and a second recess is formed at the facing surface and is recessed in a direction away from the end-face electrode.

* * * * *